Jan. 12, 1954     J. W. EDGEMOND, JR     2,665,722
DADO SAW ASSEMBLY
Filed Feb. 19, 1951     2 Sheets-Sheet 1
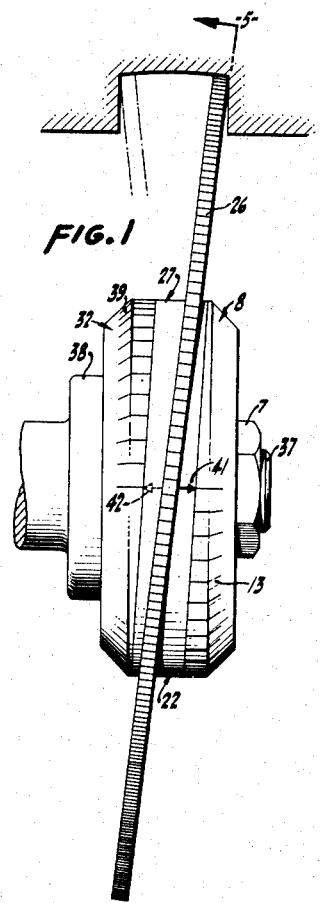
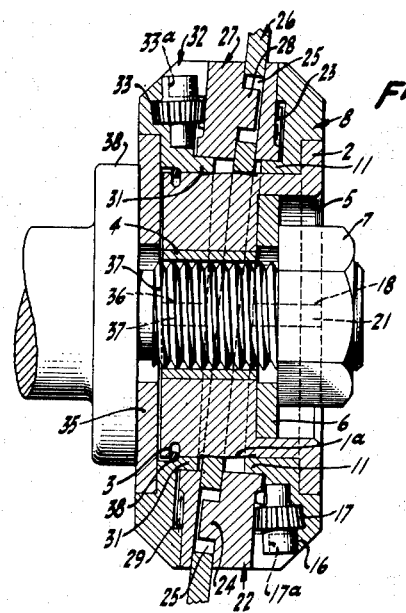
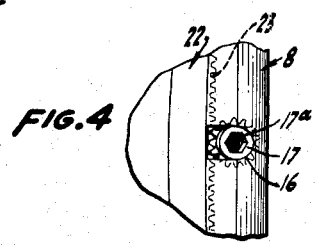
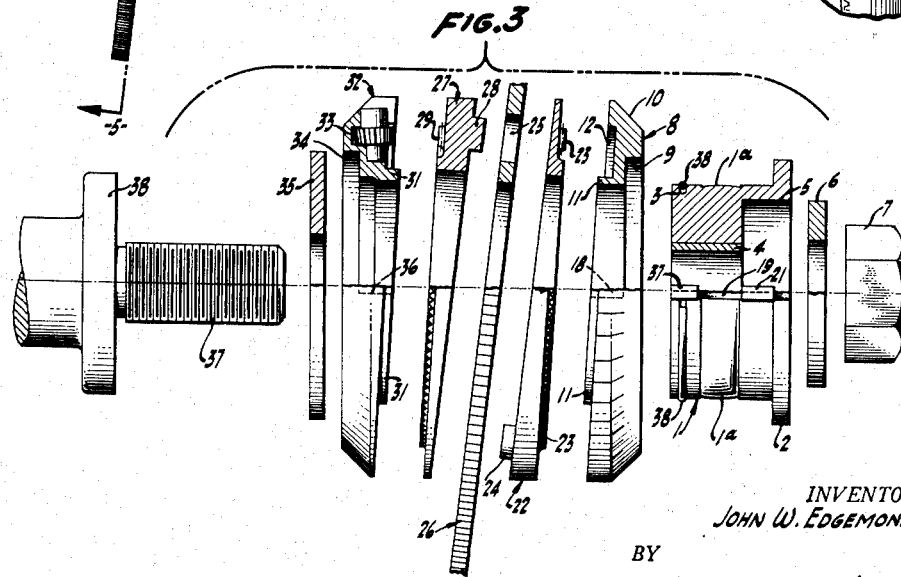
INVENTOR.
JOHN W. EDGEMOND, JR.
BY
*Mellin and Hanscom*
ATTORNEYS Jan. 12, 1954     J. W. EDGEMOND, JR     2,665,722
DADO SAW ASSEMBLY
Filed Feb. 19, 1951     2 Sheets-Sheet 2
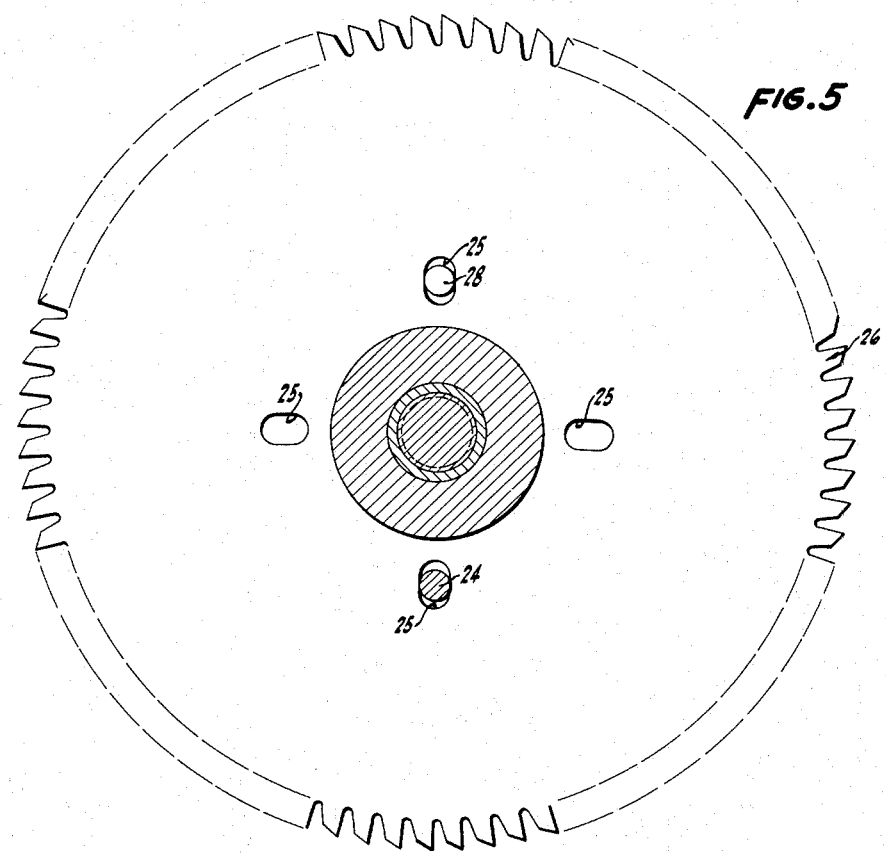
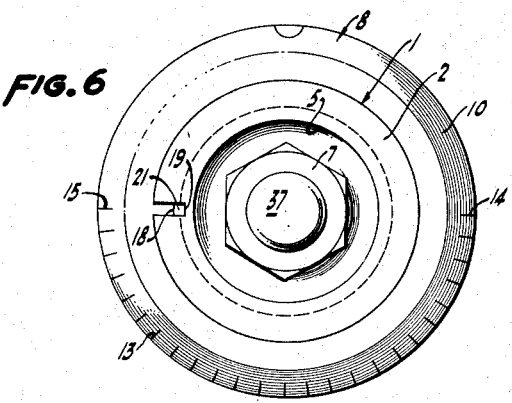
INVENTOR.
JOHN W. EDGEMOND, JR.
BY
Mellin and Hanscom
ATTORNEYS Patented Jan. 12, 1954

2,665,722

UNITED STATES PATENT OFFICE 2,665,722

DADO SAW ASSEMBLY

John W. Edgemond, Jr., Los Altos, Calif., assignor to Magna Engineering Corporation, San Francisco, Calif., a corporation of California Application February 19, 1951, Serial No. 211,647

4 Claims. (Cl. 144—238)

This invention relates to dado saws and in general has for its object the provision of a wobble type dado saw assembly provided with means for readily and positively adjusting the angularity of the saw.

More specifically, one of the objects of this invention is the provision of a wobble type dado saw assembly wherein two opposed pairs of inner and outer wedge-shaped plates or rings are provided with racks and pinions for readily and positively adjusting the angularity between the rings, thereby to adjust the angularity of a saw clamped between them.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings:

Fig. 1 is a side elevation of a dado saw assembly embodying the objects of my invention.

Fig. 2 is a vertical mid-section taken through the assembly illustrated in Fig. 1.

Fig. 3 is an exploded view of the assembly shown in Figs. 1 and 2.

Fig. 4 is a fragmentary view of an edge of the assembly showing one of its pinions in end elevation.

Fig. 5 is a section taken on the section line 5—5 of Fig. 1.

Fig. 6 is a right end elevation of the assembly as shown in Fig. 1 but with the saw removed.

The assembly shown in these various figures includes a hub 1 provided with a central crowned portion 1a and formed at one end with a radially extending flange 2 and at its other end with a lock ring groove 3. Mounted within the hub 1 and having a force fit therewith is a bushing 4 and formed in the right end of the hub as viewed in Fig. 3 is a counterbore 5 for the reception of a washer 6 and a nut 7.

Mounted on the hub 1 is an outer wedge-shaped plate or ring 8 formed on its right hand face with a counterbore 9 for the reception of the hub flange 2. Extending inwardly of the ring 8 is a bearing shoulder 11 in part defining an inner channel 12. The outer edge of ring 8 is beveled as at 10 and is provided with a scored scale 13 having a fiducial line 14 and a maximum terminal line 15 as shown in Fig. 6. Formed on the inner face of the ring 8 adjacent its outer edge at its thickest point is a pinion seat 16 and journaled in parts thereof within the confines of the channel 12 is a radially disposed beveled pinion 17 provided with an axial wrench socket 17a. Formed in the ring 8 is a keyway 18 in alignment with a keyway 19 formed in the hub 1 and accommodated in these two keyways is a key 21 serving to hold the hub 1 and ring 8 against relative rotation.

Journaled on the bearing shoulder 11 of the ring 8 is an inner wedge-shaped plate or ring 22 provided on its outer surface with a circular rack 23 in registration with the pinion 17. Formed on the thickest portion of the ring 22 adjacent the periphery thereof is a stud 24 arranged to extend into any one of four radially elongated slots 25 symmetrically formed in a circular saw 26. The width of these slots is preferably only slightly greater than the diameter of the stud 24 and the slots are elongated to permit of the radial movement therein of the stud 24. The saw 26 is mounted on the crowned portion 1a of the hub 1 and is designed to have surface engagement with the inner surface of the ring 22.

Disposed on the opposite or left hand side of the saw 26 as illustrated in Fig. 3 is an inner wedge-shaped plate or ring 27 identical in all respects to the ring 22 and therefor provided with an inwardly extending stud 28 receivable in one of the slots 25 of the saw and with an annular rack 29 formed on its outer surface. As shown in Fig. 3 the inner surface of the rings 22 and 27 are parallel to each other and likewise their outer surfaces are parallel to each other.

The ring 27 is mounted on an inwardly extending bearing shoulder 31 formed on an outer wedge-shaped plate or ring 32, the construction of this ring being identical to the construction of the ring 8. To this end there is mounted in the ring 32 a radially disposed pinion 33 arranged to mesh with the circular rack 29 of its associated inner ring 27 and provided with a wrench socket 33a. The ring 32 is mounted on the left hand end of the hub 1 as best shown in Figs. 2 and 3, and like the ring 8, is provided on its outer surface with a counterbore 34 arranged to accommodate a washer 35. Formed in the ring 32 is a keyway 36 in alignment with the keyway 19 of the hub 1 and arranged to receive a key 37. Accommodated in the lock ring groove 3 is a conventional spring steel lock ring 38 serving to lock the two pairs of inner and outer wedge-shaped rings to the hub 1.

The entire assembly, including the washers 6 and 35, is arranged to be mounted on a power-driven threaded spindle 37 provided with a flange or shoulder 38, the nut 7 being screwed to the outer end of the spindle 37 so as to clamp this entire assembly to the spindle in its operative position.

Scored on the periphery of the ring 32 is a scale 39 identical to the scale 13 and scored on the inner rings 22 and 27 are fiducial lines 41 and 42. The peripheral surface of the hub 1 aside from its crowned portion 1a is cylindrical in form and coaxial with the axis of the hub. The inner cylindrical surfaces of the bearing shoulders of the outer rings 8 and 32 should be perpendicular to their outer surfaces whereas the outer bearing surfaces of these shoulders (for example, shoulder 11 of ring 8), should be at right angles with the inner surfaces of these rings. The angle between the outer and inner faces of each of the outer rings will, of course, determine the maximum angularity to which the saw can be adjusted and for practical purposes can be in order of 3°.

From this construction it will be noted that the studs 24 and 28 serve to key the inner rings 22 and 27 to the saw 26, these members, however, being free to rotate on the bearing shoulders 11 and 31 relative to the outer rings 8 and 32 in response to the rotation of the pinions 17 and 33. The outer rings 8 and 32 are both keyed to the hub 1 and consequently any movement imparted to any one of these members is transmitted to the other two members. In the position of this assembly as shown in Fig. 1, the angularity of the three central members, that is, the inner rings 22 and 27, and the saw 26, is at its maximum with respect to the outer rings 8 and 32 and in this position the saw will, of course, produce a groove of the greatest width on the work being operated on. The width of this groove, of course, depends upon the diameter of the saw and it is for this reason that the scales 13 and 39 scored on the outer rings cannot be calibrated in terms of the width of the groove or kerf cut. This is true for when the saw is sharpened its diameter, of course, is slightly decreased. However, these scales can, of course, be calibrated against a block in which a series of grooves of different width have been cut, for a saw of a predetermined diameter.

When it is desired to adjust the angularity of the saw it is only necessary to slightly retract the nut 7 so as to permit of the relative movement of the outer and inner set of rings. By then placing a wrench in the wrench socket of either of the pinions 17 and 33 the pinion in question can be rotated to shift the angularity between the outer and inner rings as desired with reference to the scales scored thereon and when the proper adjustment has been so made, the nut 7 is then screwed home so as to lock the assembly in its operative position. Since the saw 26 is mounted on the crowned central portion 1a of the hub 1, the saw can be tilted as desired without the necessity of first filing off the edges of the saw bore as would otherwise be necessary.

Each of the outer vertical walls of any groove cut by a saw of this type is cut only by one particular point of the saw. However, when this point becomes dull, the position of the saw can be changed, by rotating it through 90° so that the studs of the inner rings occupy different slots in the saw. A further adjustment of this character can be made by rotating and inverting the saw blade.

From the above description, it will be seen that I have provided a wobble type dado saw of simple construction and the angularity of which can be readily changed by simply unscrewing the nut 7 and rotating one of the outer ring pinions.

Having thus described my invention, what I claim and desire to secure by Letters Patent is:

1. A dado saw mounting assembly comprising: a cylindrical hub having a crowned saw mount portion intermediate its ends; a pair of outer axially spaced wedge-shaped rings journaled on said hub, one on either side of said crowned saw mount portion, the outer face of each of said outer rings being normal to the axis of its bore and the inner face of each of said outer rings being inclined with respect to said axis, each of said outer rings being provided on its inner inclined face with an annular channel the bottom of which lies in a plane normal to the axis of its bore and concentric therewith; and an inner wedge-shaped ring journaled in the annular channel of each of said outer wedge-shaped rings, in face to face engagement therewith, said assembly being arranged to receive a circular saw blade on said crowned saw mount portion between said inner rings.

2. A dado saw mounting assembly such as defined in claim 1 wherein the periphery of one ring of one contacting pair of outer and inner rings is provided with a fiducial mark and the periphery of the other of said rings is provided with a saw-cut scale.

3. A dado saw mounting assembly such as defined in claim 1 wherein one ring of each contacting pair of outer and inner rings is provided with an annular rack operatively engaged by a pinion mounted on the other ring of each of said pairs of rings.

4. A dado saw assembly comprising: a spindle; a cylindrical hub mounted on said spindle, said hub having a crowned saw mount portion intermediate its ends; a saw blade mounted on said crowned saw mount portion, the diameter of the bore of said saw being equal to the diameter of said crowned saw mount portion; a wedge-shaped outer ring journaled on said hub, on each side of said saw blade and outwardly of said crowned saw mount portion, the outer face of each of said outer rings being normal to the axis of its bore and the inner face thereof being inclined with respect to said axis, each of said outer rings being provided on its inner inclined face with an annular channel the bottom of which lies in a plane normal to the axis of the bore of said ring and concentric therewith; an inner wedge-shaped ring journaled in the annular channel of each of said outer rings in face to face contact therewith; an inwardly extending projection provided on the inner face of each of said inner rings, said projections being accommodated in radial slots formed in said saw blade; and means for locking said outer and inner rings to said saw blade.

JOHN W. EDGEMOND, Jr.

References Cited in the file of this patent

UNITED STATES PATENTS

| Number | Name | Date |
|---|---|---|
| 45,677 | Rogers | Dec. 27, 1864 |
| 154,808 | Seymour | Sept. 8, 1874 |
| 261,680 | Cook | July 25, 1882 |
| 292,316 | Johnson | Jan. 22, 1884 |
| 474,844 | Mann | May 17, 1892 |
| 541,494 | Nixholm | June 25, 1895 |
| 716,094 | Peoples | Dec. 16, 1902 |
| 771,401 | Van Amberg | Oct. 4, 1904 |
| 1,244,231 | Mouche | Oct. 23, 1917 |
| 1,568,199 | Watson | Jan. 5, 1926 |
| 1,586,139 | Bivins | May 25, 1926 |
| 2,544,814 | Warren | Mar. 13, 1951 |